United States Patent
Shouno

(10) Patent No.: US 9,100,527 B2
(45) Date of Patent: Aug. 4, 2015

(54) COMMUNICATION APPARATUS, CONTROL METHOD THEREFOR, AND STORAGE MEDIUM

(75) Inventor: Hiroki Shouno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 13/108,284

(22) Filed: May 16, 2011

(65) Prior Publication Data

US 2011/0216343 A1    Sep. 8, 2011

Related U.S. Application Data

(63) Continuation of application No. 12/412,604, filed on Mar. 27, 2009, now Pat. No. 7,966,415.

(30) Foreign Application Priority Data

Mar. 28, 2008    (JP) .................................. 2008-086956

(51) Int. Cl.
*G06F 1/32*    (2006.01)
*H04N 1/00*    (2006.01)
(Continued)

(52) U.S. Cl.
CPC ....... *H04N 1/00885* (2013.01); *H04N 1/00204* (2013.01); *H04N 1/00244* (2013.01); *H04N 1/00896* (2013.01); *H04N 1/33323* (2013.01); *H04N 1/33384* (2013.01); *H04N 2201/0094* (2013.01); *H04N 2201/33342* (2013.01)

(58) Field of Classification Search
CPC ....... G06F 1/32; G06F 1/3203; G06F 1/3215; G06F 1/3296; G06F 1/3237; G06F 1/325; G06F 1/3284; H04L 12/24; H04L 12/2435; H04L 41/08; H04L 41/0836; H04N 1/00204; H04N 1/00244; H04N 1/00885–1/00904; H04N 2201/0094

USPC .......................... 709/220–221, 223–229, 232
See application file for complete search history.

(56) References Cited

U.S. PATENT DOCUMENTS 6,611,658 B1 * 8/2003 Takahashi .................... 388/800
7,216,243 B2 * 5/2007 Chou et al. .................... 713/320
(Continued)

FOREIGN PATENT DOCUMENTS

CN    101013285 A    8/2007
JP    2001-154763 A    6/2001
(Continued)

*Primary Examiner* — Patrice Winder
(74) *Attorney, Agent, or Firm* — Canon U.S.A., Inc. IP Division

(57) ABSTRACT

A communication apparatus, which has a normal power consumption mode and a power saving mode lower in power consumption than in the normal power consumption mode and which is connected to a network via a network interface device, communicates with a device on the network via the network interface device. The communication apparatus acquires capability information indicating a communication capability of the device, and based on acquired capability information, determines a communication mode to be used when the network interface device communicates with the device under a condition that the communication apparatus has shifted to the power saving mode, and when the communication apparatus shifts from the normal power consumption mode to the power saving mode, sets the determined communication mode as a communication mode to be used when the network interface device communicates with the external device.

14 Claims, 9 Drawing Sheets

(51) Int. Cl.
*H04N 1/333* (2006.01)
*G06F 15/16* (2006.01)

(56) References Cited

U.S. PATENT DOCUMENTS

| | | | |
|---|---|---|---|
| 7,360,106 B2* | 4/2008 | Kato et al. | 713/323 |
| 7,856,526 B2* | 12/2010 | Shibayama et al. | 711/112 |
| 7,984,315 B2* | 7/2011 | Ito | 713/324 |
| 8,024,589 B2* | 9/2011 | Okoge et al. | 713/320 |
| 2002/0140963 A1* | 10/2002 | Otsuka | 358/1.14 |
| 2005/0097469 A1* | 5/2005 | Kasashima | 715/718 |
| 2005/0239518 A1* | 10/2005 | D'Agostino et al. | 455/574 |
| 2005/0251697 A1* | 11/2005 | Narukawa et al. | 713/310 |
| 2006/0212730 A1* | 9/2006 | Senda | 713/300 |
| 2007/0079006 A1* | 4/2007 | Oya | 709/245 |
| 2009/0094468 A1* | 4/2009 | Larson | 713/310 |
| 2009/0228695 A1* | 9/2009 | Pathak | 713/1 |

FOREIGN PATENT DOCUMENTS

| | | |
|---|---|---|
| JP | 2005-094679 A | 4/2005 |
| JP | 2006-293983 A | 10/2006 |
| JP | 2007-276341 A | 10/2007 |

* cited by examiner

COMMUNICATION APPARATUS, CONTROL METHOD THEREFOR, AND STORAGE MEDIUM

CROSS REFERENCE TO RELATED APPLICATIONS

This application is a continuation application of U.S. patent application Ser. No. 12/412,604 filed Mar. 27, 2009, which claims priority from Japanese Patent Application No. 2008-086956 filed Mar. 28, 2008, which are hereby incorporated by reference herein.

BACKGROUND OF THE INVENTION

1. Field of the Invention

The present invention relates to a communication apparatus having a normal power consumption mode and a power saving mode and connected to a network via a network interface device.

2. Description of the Related Art

Heretofore, in image forming apparatuses, such as multifunctional peripherals or single-function printers, various schemes have been adopted to reduce power consumption. Among others, image forming apparatuses with a sleep mode (power saving mode) for consuming less power than in a standby state (normal power consumption mode) have become widespread.

In the sleep mode, power supply to the units of the image forming apparatus is stopped except to a random access memory (RAM), a network interface card (NIC), and an operation unit, so that power consumption during the sleep mode can be reduced to about 1 Watt (W) to a few W. During the sleep mode, an image forming process cannot be performed because during the sleep mode, power supply to the photosensitive drum and the fixing unit in the printer unit of the image forming apparatus is stopped, and also power supply to the central processing unit (CPU) and the hard disk drive (HDD) is stopped.

When a predetermined condition is met during the sleep mode, the image forming apparatus returns from the sleep mode to the standby state. The predetermined condition includes, for example, that (1) a user has operated the operation unit of the image forming apparatus, and that (2) the NIC has received a packet that meets the return condition from the sleep mode to the standby state. Thus, power is supplied to the operation unit or the NIC even during the sleep mode to check if any button is pressed on the operation unit or if the packet is received.

Packets that meet the return conditions include (1) a unicast packet addressed to the image forming apparatus, (2) a return packet to request a return from the sleep mode to the standby state, and (3) broadcast packets or multicast packets of a specific protocol. In other words, the return packet (2) denotes a magic packet that includes a particular pattern in the packet. The broadcast packets or multicast packets of a specific protocol (3) are search packets formatted according to a protocol to enable another node on the network to search for the image forming apparatus on the network.

In order to receive packets described above, the NIC of the image forming apparatus needs to be linked to the network also when the image forming apparatus is in the sleep mode. If the network standard is Ethernet®, for example, the NIC is linked in a communication mode previously specified or linked in a communication mode determined by using auto-negotiation defined in IEEE802.1u. The communication mode mentioned here includes a link speed (communication speed) and a duplex mode (full duplex or half duplex).

The NIC in some recent image forming apparatuses supports a communication speed of 1000 Mbps (1 Gbps) in addition to the conventional speeds of 10 Mbps and 100 Mbps. However, in a communication mode of 1000 Mbps, the power consumption of the NIC is larger than that at 10 Mbps or 100 Mbps. Therefore, there is known a method for reducing power consumption in the sleep mode, which causes the NIC to behave as if it does not support 1000 Mbps during the shift from the standby state to the sleep mode and then causes the NIC to be linked back to the network.

It is possible to further reduce power consumption by selecting a low communication speed to suit the communication capability of the hub on the network from among communication speeds (10 Mbps and 100 Mbps) other than 1000 Mbps.

For example, Japanese Patent Application Laid-Open No. 2004-243533 discusses a method in which, when an image forming apparatus shifts to the power saving mode under the condition that the apparatus is connected to the hub, the media access control (MAC) unit of the image forming apparatus determines a communication speed in a manner to suit the communication capability of the hub.

Japanese Patent Application Laid-Open No. 2002-271334 describes a method in which, when communication has not taken place in the communication apparatus for a fixed period of time, the NIC connected to the host and the LAN changes the communication speed set in itself to a lower speed.

However, in a communication system in which the communication apparatus is connected to a network via the network interface device, consideration has not been taken for reduction of power consumption at the network interface device side when the communication apparatus is in the power saving mode.

More specifically, in Japanese Patent Application Laid-Open No. 2004-271334 mentioned above, since the image forming apparatus itself is directly connected to the network, attention has not been paid to a reduction of power consumption at the network interface device, which is independent from the image forming apparatus.

In Japanese Patent Application Laid-Open No. 2002-271334 described above, the NIC itself acts to reduce power consumption. However, when communication has not taken place in the NIC for a fixed period of time, the NIC discussed in Japanese Patent Application Laid-Open No. 2002-271334 changes settings of the communication mode in the NIC, but not in response to a command from another communication apparatus (the host).

As described above, in a system where the communication apparatus is connected to a network via the network interface device, power consumption cannot be reduced by the network interface device connected to the communication apparatus. Unless the network interface device itself incorporates some mechanism to reduce power consumption, power consumption by the network interface device cannot be reduced even when the communication apparatus enters the power saving mode.

SUMMARY OF THE INVENTION

The present invention is directed to a communication apparatus capable of determining, on the communication apparatus side, a communication mode of a network interface device under the condition that the communication apparatus has shifted to a power saving mode, and setting the communication mode in the network interface device.

According to an aspect of the present invention, a communication apparatus, which has a normal power consumption mode and a power saving mode lower in power consumption than in the normal power consumption mode, and which is connected to a network via a network interface device, includes a communication unit configured to communicate with a device on the network via the network interface device, an acquisition unit configured to acquire capability information indicating a communication capability of the device, a determination unit configured to, based on the capability information acquired by the acquisition unit, determine a communication mode to be used when the network interface device communicates with the device under a condition that the communication apparatus has shifted to the power saving mode, and a setting unit configured to, when the communication apparatus shifts from the normal power consumption mode to the power saving mode, set the communication mode as a communication mode to be used when the network interface device communicates with the device.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Various exemplary embodiments, features, and aspects of the invention will be described in detail below with reference to the drawings.

In a first exemplary embodiment, the operation of the MFP 100 to be performed when the MFP 100 is started, when the MFP 100 shifts to the sleep mode, when the MFP 100 returns to the standby state, and when the MFP 100 is in the standby state (especially, link operations to Ethernet®) will be described in the following.

Figure 1:
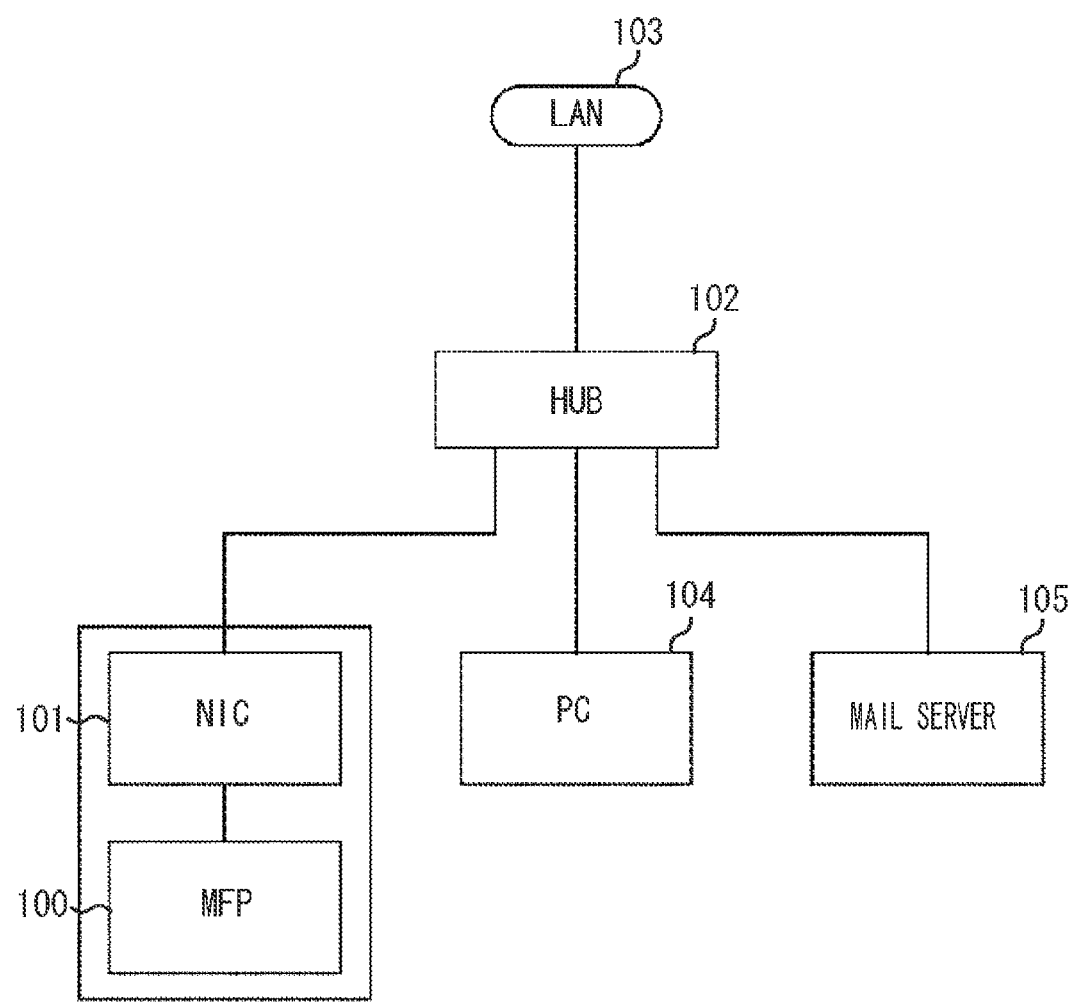
FIG. 1 is a view of a communication system according to an exemplary embodiment of the present invention.

FIG. 1 is a view of a communication system according to the first exemplary embodiment of the present invention. In the communication system illustrated in FIG. 1, the communication apparatus (MFP 100) is connected to a hub 102 via a network interface card (NIC) 101 (network interface device), and the hub 102 is further connected to a local area network (LAN) 103. In addition to the NIC 101, a personal computer (PC) 104 and a mail server 105 are connected to the hub 102.

The hub 102 is a line concentrator for Ethernet® cables, for example, and supports three kinds of communication speeds (link speeds) of 10 Mbps, 100 Mbps, and 1000 Mbps. With regard to duplex modes, the hub 102 supports full duplex mode and half duplex mode at 10 Mbps and 100 Mbps, and full duplex mode at 1000 Mbps.

It is supposed that communication modes, such as a link speed and a duplex mode, are to be set at each port of the hub 102 in advance. In setting a communication mode, autonegotiation can be previously set in such a manner that autonegotiation can be performed instead of fixedly setting a link speed or a duplex mode.

Figure 2:
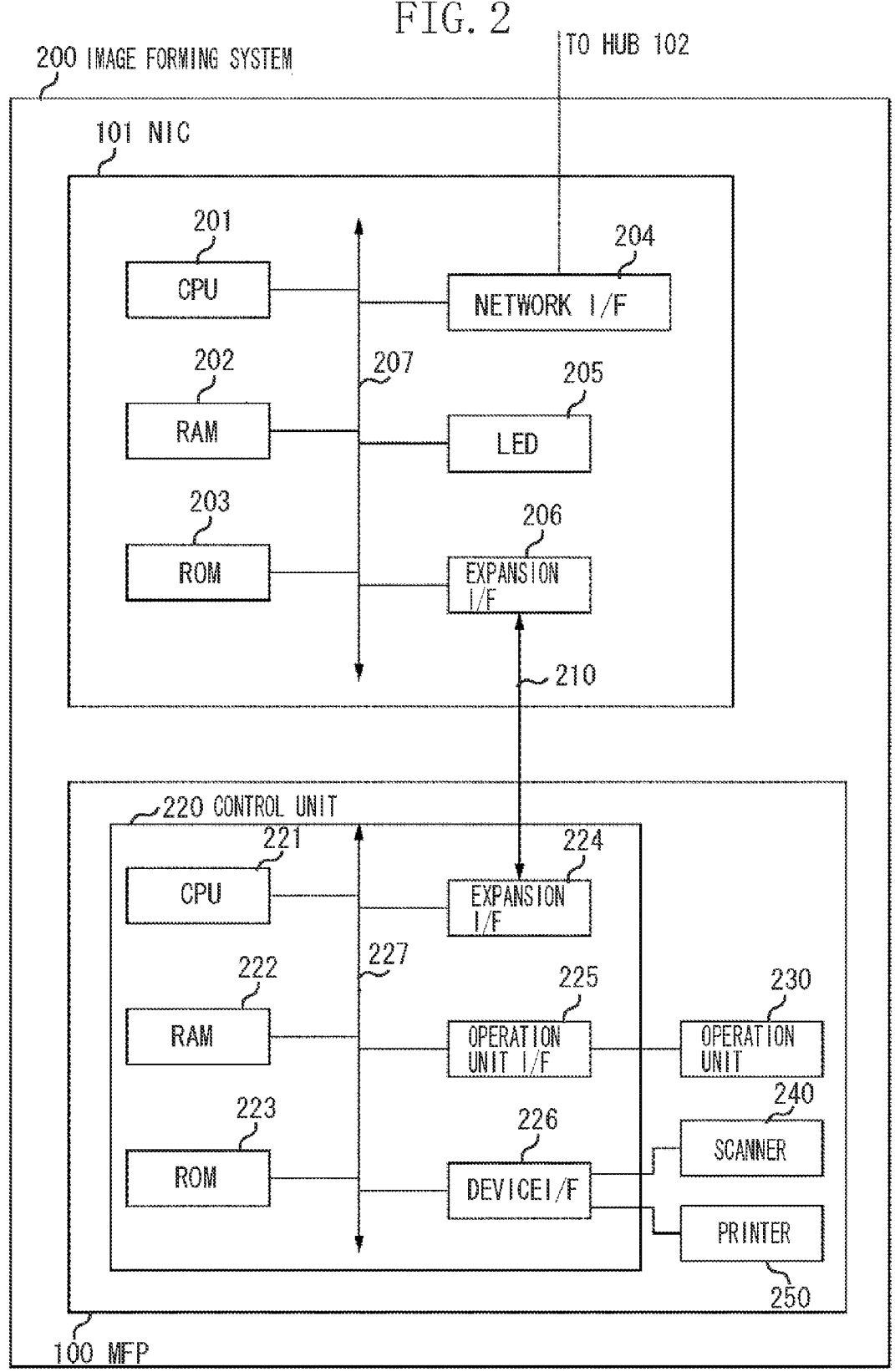
FIG. 2 is a block diagram illustrating a configuration of an image forming system according to the exemplary embodiment of the present invention.

FIG. 2 is a diagram illustrating the configuration of an image forming system 200, which includes an MFP 100 and an NIC 101.

The NIC 101, which has been implemented by an intelligent type network card module, is a network interface device detachably connected to the MFP 100. The NIC 101 includes a CPU 201, a RAM 202, a ROM 203, a network interface (I/F) 204, a light emitting diode (LED) 205, an expansion I/F 206, all being used as components of the NIC 101, and a system bus 207 configured to interconnect those components.

The CPU 201 reads a control program stored in the ROM 203 and executes various control processes. For example, the CPU 201 is connected to the hub 102 via the network I/F 204 connected to the system bus 207, and is further connected via the hub 102 to terminals on the LAN 103 to execute communication processes in compliance with a predetermined communication protocol. As a result, the CPU 201 can receive various data, such as print data and printer control commands, sent from, for example, a print data generating device on the LAN 103, transfer data via the expansion I/F 206 to the MFP 100, and carry out a print process in the MFP 100.

The RAM 202 is the main memory of the CPU 201 and is used as a temporary storage area, such as the work area. The LED 205 is used as a display to show the operating state of the NIC 101. The LED 205 uses colors or blinking patterns of LED light to show an electric connection state between the network I/F 204 and the hub 102 and various operating states, such as a communication state.

The expansion I/F 206 connects the NIC 101 and the MFP 100, and is connected to an expansion I/F 224 on the MFP 100 side via a local cable 210. The expansion I/F 206 includes a connector (not shown). The NIC 101 is detachably connected to the printer MFP 100 by the connector. Further, the NIC 101 can be mounted on another MFP having a similar configuration.

The network I/F 204 has a capability of communication at a link speed of any one of 10 Mbps, 100 Mbps, and 1000 Mbps and either in full duplex or half duplex when the MFP 100 is in the standby state. The network I/F 204 is set as to communicate at a link speed of 10 Mbps or 100 Mbps and in full or half duplex when the MFP 100 is in the sleep mode. In other words, the network I/F 204 operates to support 10 Mbps and 100 Mbps, but does not support 1000 Mbps when the MFP 100 is in the sleep mode.

The MFP 100 also includes a control unit 220, an operation unit 230, a scanner 240, and a printer 250.

The control unit 220 includes a CPU 221 for the MFP 100, a RAM 222, a ROM 223, an expansion I/F 224, an operation unit I/F 225, a device I/F 226, and a system bus 227 to interconnect those units.

The CPU 221 reads a control program stored in the ROM 223, and executes various control processes. For example, the CPU 221 generates output image data based on print data transferred from the NIC 101 via the expansion I/F 224, and outputs the output image data to the printer 250 via the device I/F 226.

The RAM 222, which functions as the main memory of the CPU 221, is used as a work area, for example. The RAM 222 is configured so that its storage capacity can be increased by connecting an optional RAM to an expansion port (not shown).

The operation unit 230 is provided with buttons to execute operations, such as setting the operation mode of the MFP 100 and deleting print data, and also provided with a display section, including a liquid crystal panel and LED indicators. A communication mode can be set on the operation unit 230.

The printer 250 is a printer utilizing a well-known printing technology, and prints image data by using an electrophotographic method (laser beam method), inkjet method, or sublimation method (thermal transfer method). The scanner 240 generates image data by reading images on an original document, and inputs data into the MFP 100.

The MFP 100 has a sleep mode in which power consumption is lower than when the MFP 100 is in the standby state. When the MFP 100 is in the sleep mode, power consumption is reduced by stopping power supply to the units other than specific units (e.g., the operation unit 230 and the expansion I/F 224).

Figure 3:
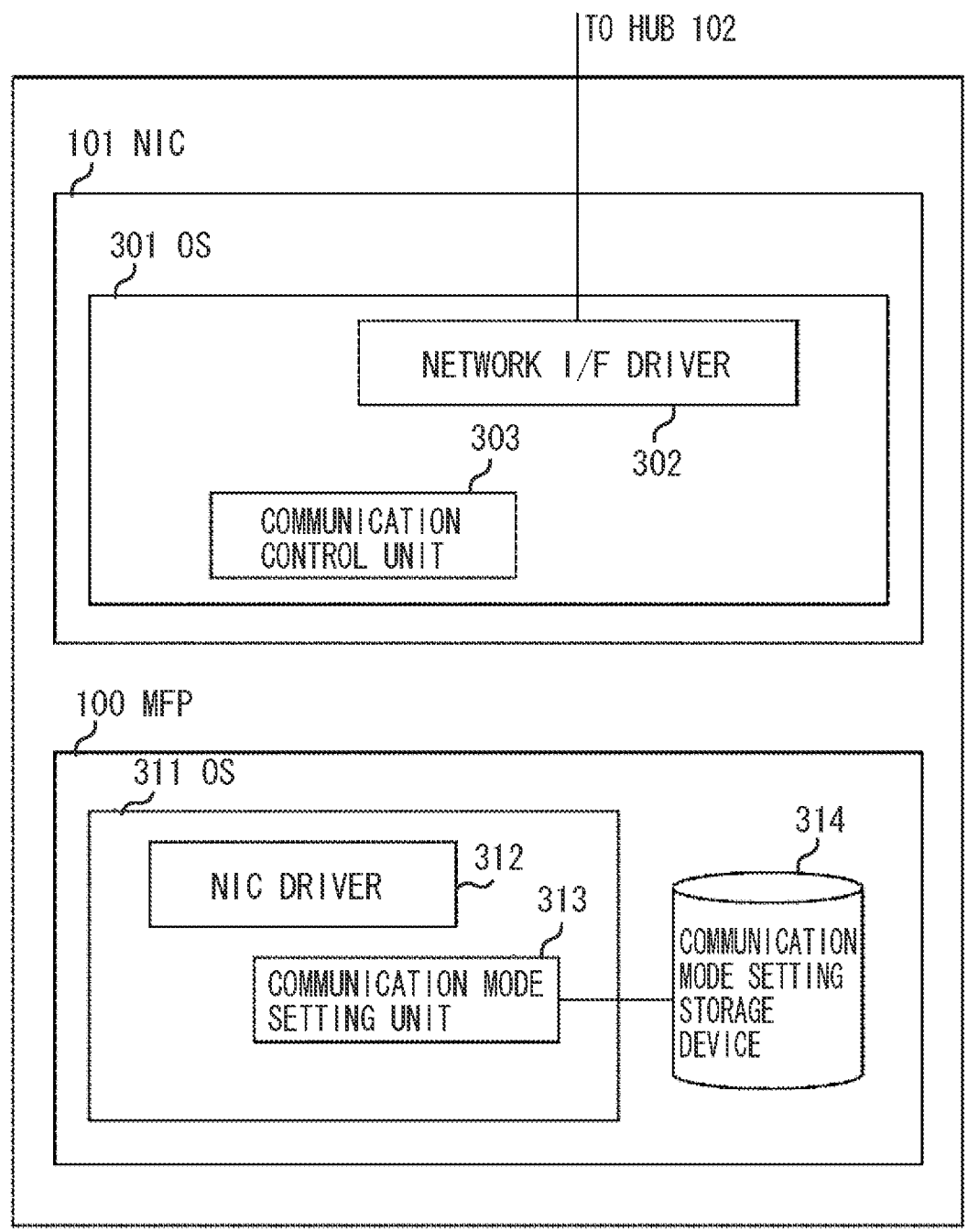
FIG. 3 is a software configuration diagram of an NIC and a multifunction peripheral (MFP) according to the exemplary embodiment of the present invention.

FIG. 3 is a software configuration diagram of the NIC 101 and the MFP 100. Here, description is limited to setting of a communication mode in the NIC 101, but it is to be noted that NIC 101 and the MFP 100 contain various items of software other than the software described below.

Those items of software illustrated in FIG. 3 stored in the storage of the NIC 101 or the MFP 100, and in response to a startup of the NIC 101 or the MFP 100, those items of software are read and executed by the CPU 221.

A network I/F driver 302 and a communication control unit 303 are provided on an operating system (OS) 301 on the NIC 101 side. The network I/F driver 302 controls the execution of a communication process by the network I/F 204. The communication control unit 303 sets a specified communication mode in the network I/F driver 302 according to contents specified by the MFP 100 side by using a method to be described below.

An NIC driver 312 and a communication mode setting unit 313 are provided on an operating system (OS) 311 on the MFP 100 side. The NIC driver 312 sends various commands to the NIC 101 to cause the NIC 101 to execute various operations. The communication mode setting unit 313, by using a method to be described later, determines a communication mode to be used when the NIC 101 communicates with the hub 102, and causes the NIC 101 to set the communication mode therein.

Among those items of software that run on the OS 311 in the MFP 100, the NIC driver 312 operates in the kernel space of the OS 311, whereas the communication mode setting unit 313 operates in the user space of the OS 311.

By using an application program interface (API) of the NIC driver 312, the communication mode setting unit 313 can acquire various items of information of the NIC 101 and performs various settings to the NIC 101.

The various items of information of the NIC 101 include information about whether the network cable is connected to the NIC 101 (whether the NIC 101 is electrically connected to the hub 102), and information indicating the communication mode currently set in the NIC 101.

Moreover, the communication mode setting unit 313 can obtain capability information indicating the communication capability of the hub 102 from the NIC 101. More specifically, the communication mode setting unit 313 can recognize the communication capability of the hub 102 by referring to a link-partner-ability register of the NIC 101 via the NIC driver 312.

The capability information indicating the communication capability of the hub 102 is information, including whether settings, such as a communication speed and a duplex mode, or autonegotiation, to which the hub 102 can respond, are set in the hub 102.

The communication mode setting storage device 314 stores information including communication modes that can be used when the NIC 101 communicates with the hub 102 under the condition that the MFP 100 is either in the standby state or in the sleep mode. The MFP 100 causes information including communication modes determined by the communication mode setting unit 313 to be stored in the communication mode setting storage device 314, and transmits a command to the NIC 101 based on information stored in the communication mode setting storage device 314.

Figure 4:
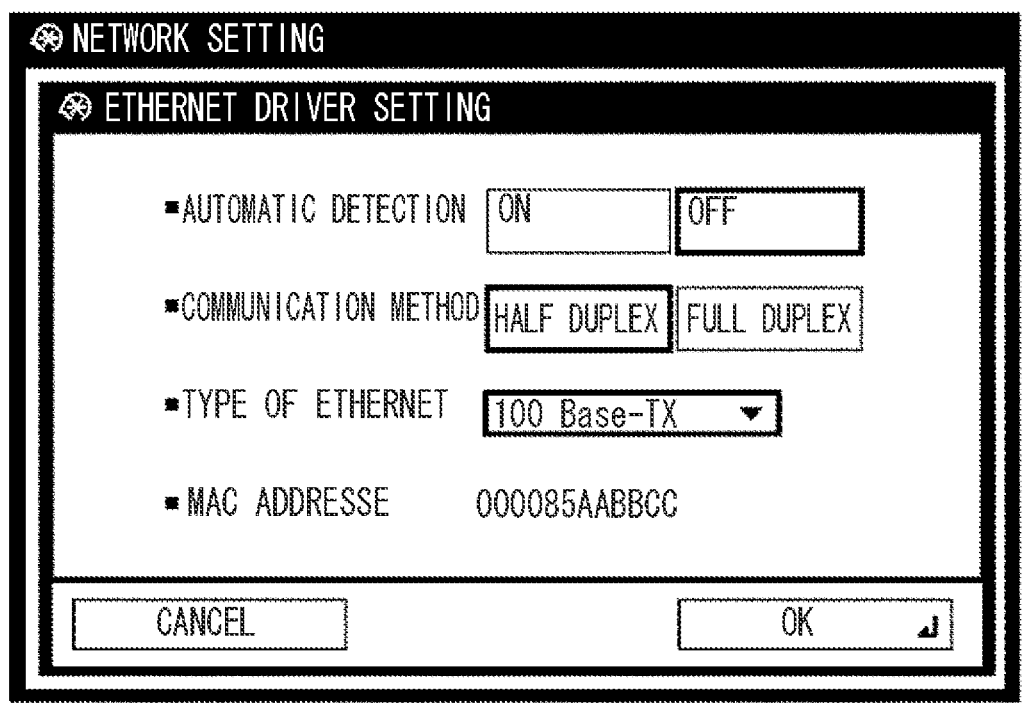
FIG. 4 is a diagram illustrating a setting screen displayed on the operation unit according to the first exemplary embodiment of the present invention.

FIG. 4 is a diagram illustrating a screen to specify a communication mode displayed on the operation unit 230. The communication mode specified via the setting screen in FIG. 4 is set in the NIC 101 as a communication mode when the NIC 101 communicates with the hub 102 when the MFP 100 is in the standby state.

In the setting screen illustrated in FIG. 4, "ON" or "OFF" of "AUTOMATIC DETECTION" can be selected. When "ON" of "AUTOMATIC DETECTION" is selected, autonegotiation takes place, so that a communication mode is determined and set automatically. Note that when "ON" of "AUTOMATIC DETECTION" is selected, it is impossible to specify a "communication mode" or a "type of Ethernet".

When "OFF" of "AUTOMATIC DETECTION" is selected, autonegotiation does not occur. Therefore, the user needs to specify "half duplex" or "full duplex" as "communication method", and also needs to specify "10 Base-T" or "100 Base-TX" as the "type of Ethernet".

Information about a communication mode set via the setting screen illustrated in FIG. 4 is stored in the communication mode setting storage device 314. The next time the MFP 100 is supplied with power and started, information stored in the communication mode setting storage device 314 is referred to, and a communication mode indicated by the information is set in the NIC 101.

Figure 5:
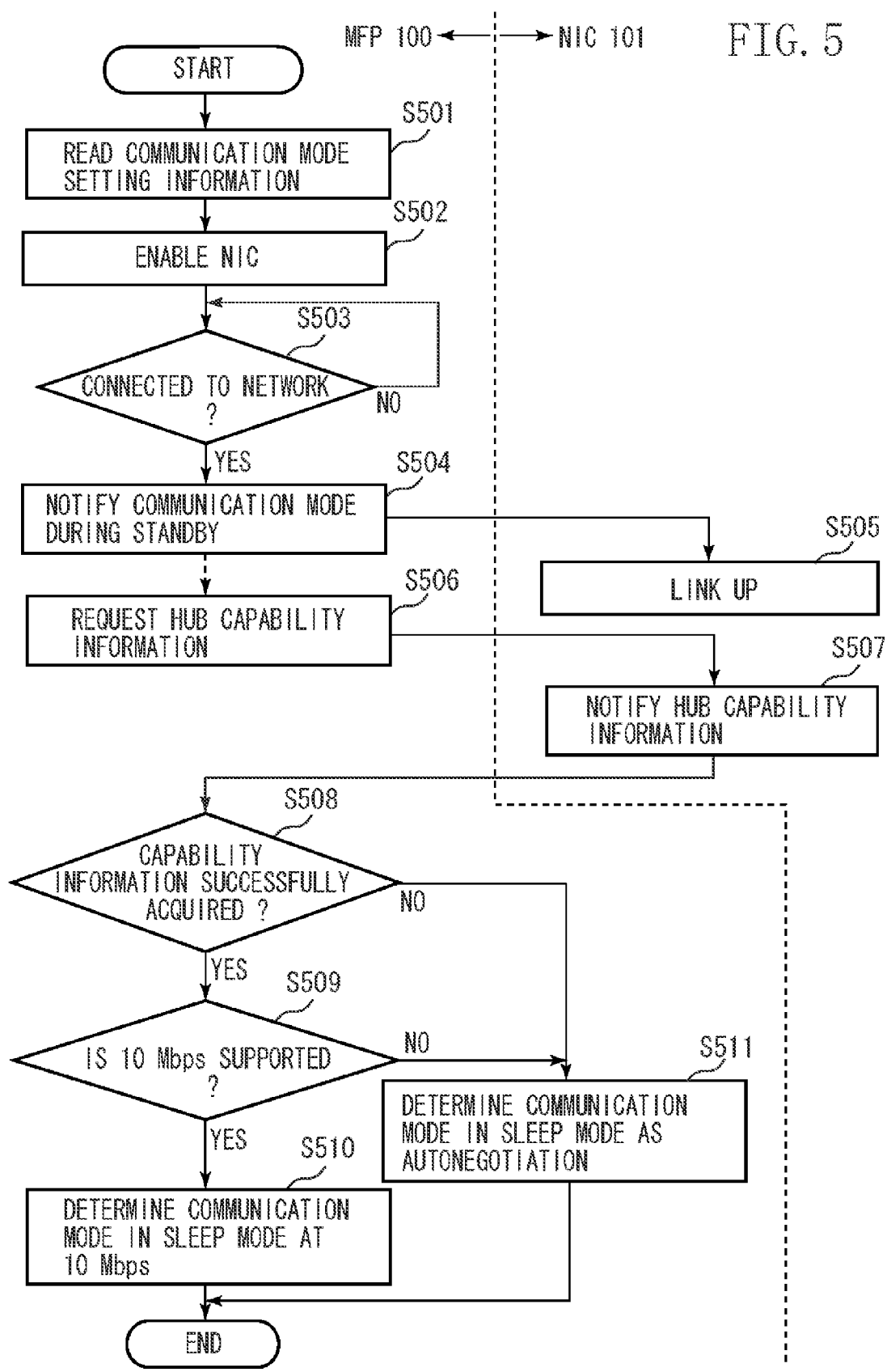
FIG. 5 is a flowchart illustrating the operation of the MFP and the NIC, which is performed when the MFP is started, according to the first exemplary embodiment of the present invention.

The operation performed when the MFP 100 is started will be described below. FIG. 5 is a flowchart illustrating the operation of the MFP 100 and the NIC 101 when the MFP 100 is supplied with power and started. The steps to the left side of the broken line in the flowchart of FIG. 5 are executed by the CPU 221 of the MFP 100. The steps to the right side of the broken line are executed by the CPU 201 of the NIC 101.

When the MFP 100 is started, in step S501, the CPU 221 reads information indicating a communication mode previously specified via the setting screen in FIG. 4 from the communication mode setting storage device 314. In step S502, the communication mode setting unit 313 sends an "ioctl" command to the NIC driver 312 to enable the NIC 101.

In step S503, the CPU 221 determines whether the NIC 101 is connected to the network. Here, in addition to whether the cable of the network is attached to the network I/F 204 of the NIC 101, the CPU 221 also determines whether the NIC 101 is electrically connected to the hub 102. This determination is made based on information about the network connection state that is acquired by the NIC driver 312 from the NIC 101 in response to the "ioctl" command sent to the NIC driver 312 from the communication mode setting unit 313.

In step S503, when the CPU 221 determines that the NIC 101 is connected to the hub 102 (YES in step S503), the process proceeds to step S504. If the NIC 101 is not connected to the hub 102 (NO in step S503), the CPU 211 waits until the NIC 101 is connected to the hub 102 (YES in step S503). In step S504, the communication mode setting unit 313 notifies, based on information read out in step S501, the NIC driver 312 of a communication mode when the MFP 100 is in the standby state by using an "ioctl" command, and the NIC driver 312 sets the communication mode in the NIC 101.

On the NIC 101 side, in step S505, the CPU 201 sets a communication mode notified from the MFP 100 as a communication mode to be used when the NIC 101 communicates with the hub 102, and establishes a link to the hub 102. When the communication mode in the standby state is autonegotiation, the NIC driver 312 executes an autonegotiation process, and the hub 102 determines a communication mode to be set by the NIC 101 based on applicable communication modes.

On the MFP 100 side, in step S506, the communication mode setting unit 313, by using an "ioctl" command, makes inquiry to the NIC driver 312 about the communication capability of the hub 102. In response to the inquiry, the NIC driver 312 makes a request to the NIC 101 for capability information indicating the communication capability of the hub 102. On receiving this request, in step S507, the NIC 101 notifies the MFP 100 of the capability information of the hub 102.

More specifically, at this time, the communication mode setting unit 313 refers via the NIC driver 312 to the content of the link-partner-ability register in the NIC 101 and obtains capability information of the hub 102. It is to be noted that for a time when conducting a linkup in step S505, the capability information of the hub 102 is obtained previously by having the NIC 101 communicate with the hub 102.

In step S508, the CPU 221 determines whether the capability information of the hub 102 has been acquired successfully. If it is determined that the capability information of the hub 102 has been acquired (YES in step S508), the process proceeds to step S509, where the CPU 221 determines whether the hub 102 supports a communication speed of 10 Mbps. If the determination result is that the hub 102 supports the communication speed of 10 Mbps (YES in step S509), the process proceeds to step S510.

In step S510, the communication mode setting unit 313 determines that the communication mode to be used when the NIC 101 communicates with the hub 102 under the condition the MFP 100 has shifted to the sleep mode is 10 Mbps. The communicating mode setting unit 313 notifies the information about the determined communication mode to the NIC driver 312.

If the determination result in step S508 is that the capability information of the hub 102 has not been acquired (NO in step S508) or if the determination result in step S509 is that the hub 102 does not support a communication speed of 10 Mbps, the process advances to step S511.

In step S511, the communication mode setting unit 313 determines that the communication mode to be used when the NIC 101 communicates with the hub 102 under the condition that the MFP 100 has shifted to the sleep mode is autonegotiation. The communication mode setting unit 313 notifies the information indicating the determined communication mode to the NIC driver 312.

As described above, when the MFP 100 is in the standby state, data communication can be conducted efficiently if the NIC 101 is linked to the network at a faster communication speed out of communication speeds at which the hub 102 can operate.

However, even after the MFP 100 has shifted to the sleep mode, if the communication speed is kept at the same speed as in the standby mode, power consumption increases, so that the effect of reducing power consumption as a result of having shifted to the sleep mode cannot be obtained sufficiently. For a communication mode when the MFP 100 is in the sleep mode, a slower one of the communication speeds at which the hub 102 can operate is determined as a communication speed when the NIC 101 communicates with the hub 102 under the condition that the MFP 100 has shifted to the sleep mode. On that account, power consumption on the NIC 101 side under the condition that the MFP 100 in the sleep mode can be reduced.

Note that at this time, not only the communication speed but also a duplex mode can be taken into account. More specifically, not only a communication mode is determined by considering a communication speed at which the hub 102 can operate, but also a communication mode, including a duplex mode, can be determined, that is, by taking into account a determination of whether the hub 102 can communicate in a half duplex or a full duplex mode. In other words, by selecting a half duplex mode or a full duplex mode according to a duplex mode in which the hub 102 can operate, a collision can be prevented from occurring in data transmission. Moreover, power consumption of the NIC 101 differs not only with a communication speed but also according to whether a half duplex or a full duplex is used, and therefore, by determining a communication mode by considering which to use out of duplex modes that the hub 102 can operate, power consumption can be further reduced.

Instead of determining a communication mode by obtaining the capability information of the hub 102 from the NIC 101 when the MFP 100 shifts to the sleep mode, by previously determining a communication mode when the MFP 100 is in the sleep mode when the MFP 100 is started, the following can be obtained.

If the MFP 100 repeatedly transmits and receives information with the NIC 101 when the MFP 100 shifts to the sleep mode, it takes time before the communication mode is changed on the NIC 101 side, and the MFP 100 cannot quickly shift to the sleep mode. To address this, as described above, before the condition is met for the MFP 100 to shift to the sleep mode, by previously determining a communication mode, it becomes possible to quickly change the communication modes of the NIC 101 when MFP 100 shifts to the sleep mode.

Figure 6:
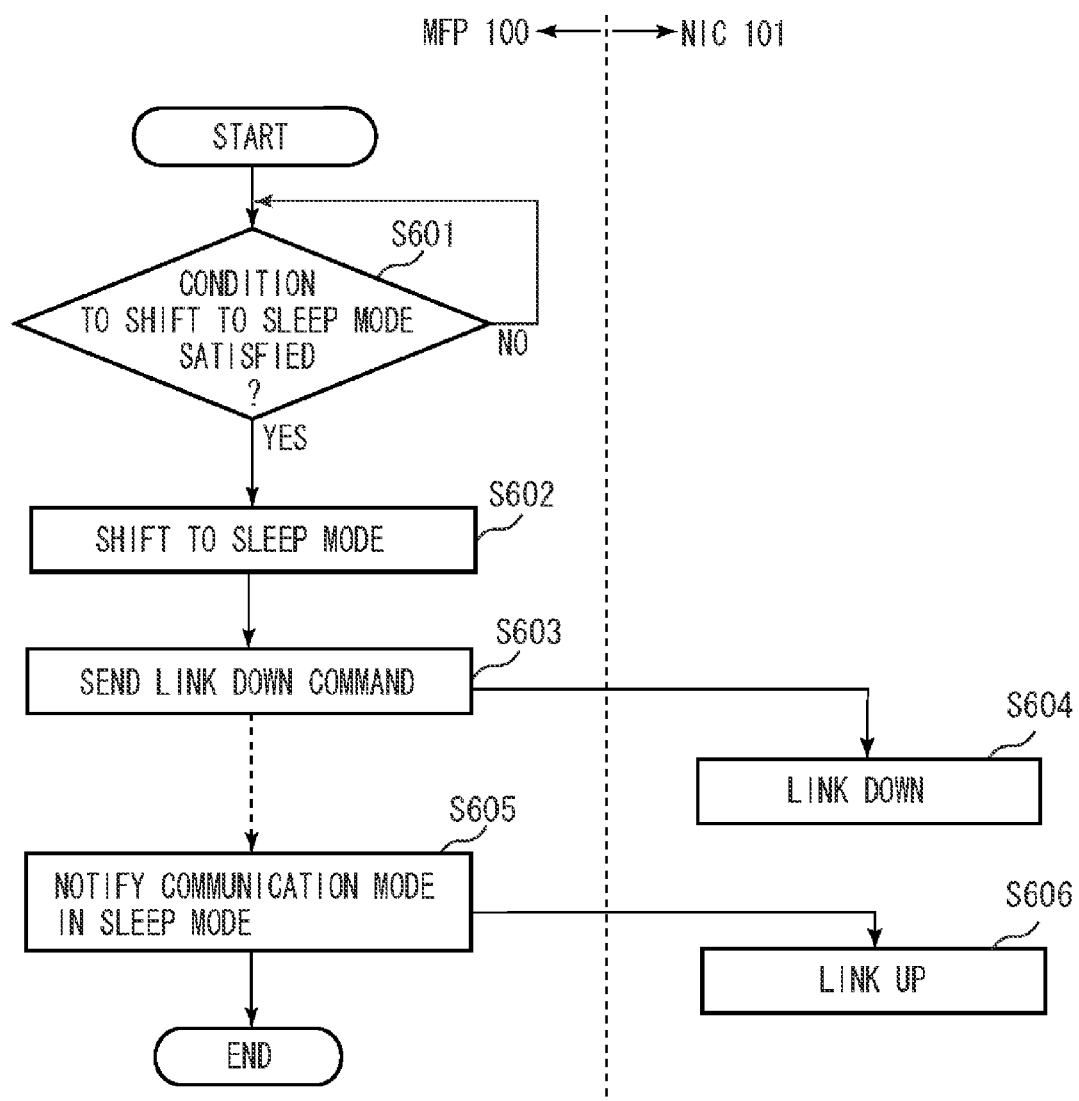
FIG. 6 is a flowchart illustrating the operation of the MFP and the NIC, which is performed when the MFP shifts to the sleep mode (power saving mode), according to the first exemplary embodiment of the invention.

Next, the operation performed when the MFP 100 shifts to the sleep mode will be described. FIG. 6 is a flowchart illustrating the operation of the MFP 100 and the NIC 101 when the MFP 100 shifts to the sleep mode. The steps to the left of the broken line in the flowchart illustrated in FIG. 6 are executed by the CPU 221 of the MFP 100. The steps to the right of the broken line are executed by the CPU 201 in the NIC 101.

The MFP 100 in the standby state, in step S601, determines whether the condition for the MFP 100 to shift to the sleep mode is met. Suppose here that this condition has been set by the user in advance, and that it is arranged that the MFP 100 shifts to the sleep mode if the user does not perform any operation for a predetermined period of time, or if a predetermined period of time elapses since the end of a print operation.

If the determination result in step S601 is that the condition to shift to the sleep mode is met (YES in step S601), the process proceeds to step S602, where the MFP 100 shifts to the sleep mode. More specifically, power supply to the units other than specified units, e.g., the operation unit 230 and the expansion I/F 224, is stopped. In addition, the communication mode setting unit 313, by using an "ioctl" command, notifies the NIC driver 312 that the MFP 100 has shifted to the sleep mode. On receiving this notification, the NIC driver 312, in step S603, instructs the NIC 101 to terminate the link to the network.

On the NIC 101 side, in step S604, when receiving a command from the NIC driver 312, the CPU 201 terminates the link to the hub 102.

On the MFP 100 side, in step S605, by using an "ioctl" command, the communication mode setting unit 313 notifies the NIC driver 312 of a communication mode when the MFP 100 is in the sleep mode, and the NIC driver 312 causes the NIC 101 to set the communication mode therein.

On the NIC 101 side, in step S606, the CPU 201 sets the communication mode notified from the MFP 100 as the communication mode to be used when the NIC 101 communicates with the hub 102, and establishes a link to the hub 102. If the communication mode when the MFP 100 is in the sleep mode is autonegotiation, the NIC driver 312 executes an autonegotiation process, and determines a communication mode for the NIC 101 to set therein based on communication modes in which the hub 102 can operate.

The communication mode when the MFP 100 is in the sleep mode can be notified to the NIC 101 at timing determined in step S510 or step S511 in FIG. 5. In this case, when the MFP 100 shifts to the sleep mode, if a message only to the effect that the MFP 100 shifts to the sleep mode is sent to the NIC 101, the communication mode up to that time is changed to a communication mode when the MFP 100 is in the sleep mode, which has been managed by a register in the NIC 101.

Figure 7:
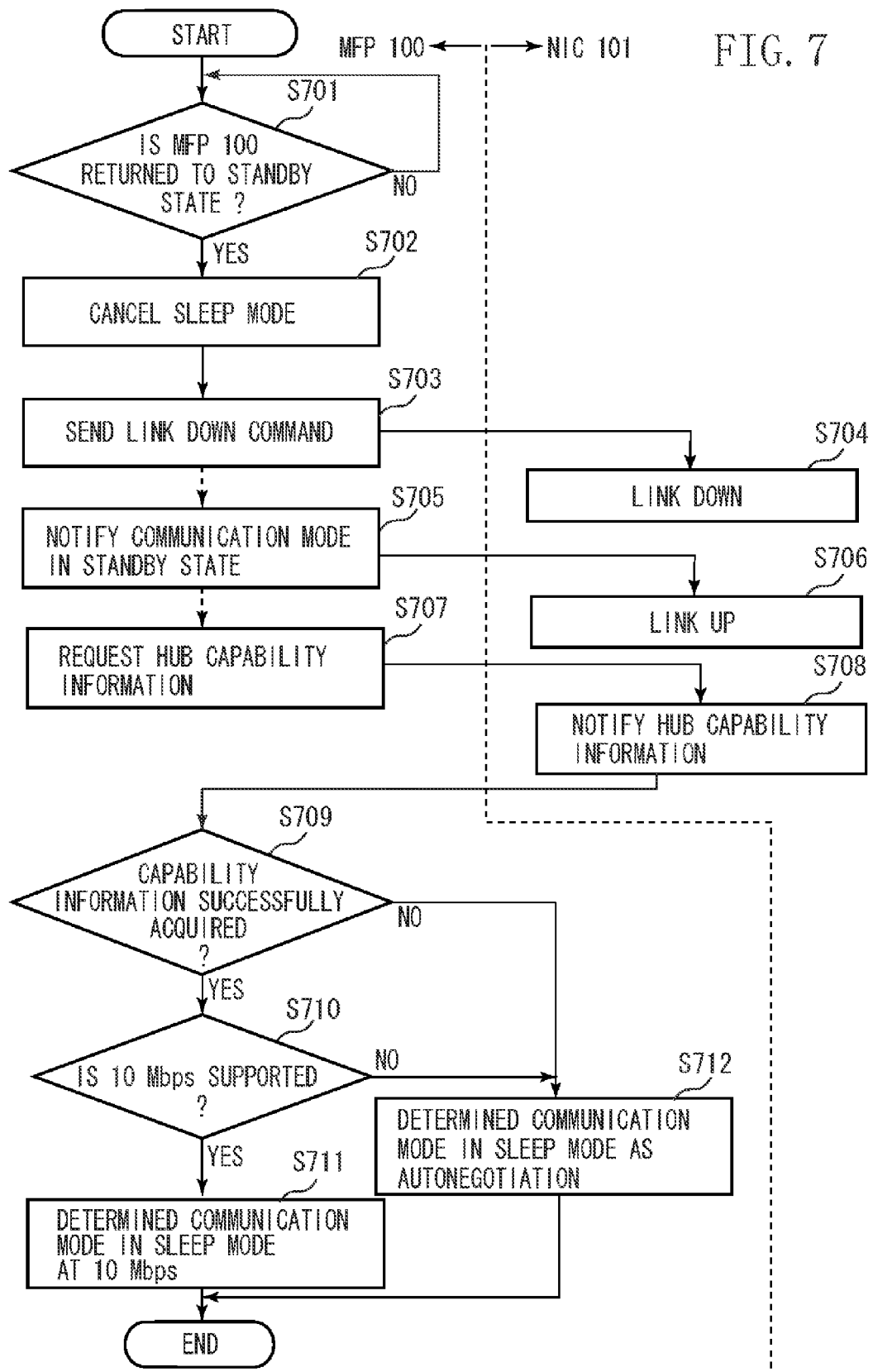
FIG. 7 is a flowchart illustrating the operation of the MFP and the NIC, which is performed when the MFP returns from the sleep mode to the standby state, according to the first exemplary embodiment of the present invention.

Next, the operation performed when the MFP 100 returns from the sleep mode to the standby state will be described. FIG. 7 is a flowchart illustrating the operation of the MFP 100 and the NIC 101 when the MFP 100 returns from the sleep mode to the standby state. The steps to the left of the broken line in the flowchart of FIG. 7 are executed by the CPU 221 of the MFP 100. The steps to the right of the broken line are executed by the CPU 201 of the NIC 101.

The MFP 100 in the sleep mode, in step S701, determines whether the condition for the MFP 100 to return to the standby state is met. Suppose here that this condition has been set by the user in advance and it is arranged that the MFP 100 returns to the standby state if the user operates the operation unit 230 or if a specific packet is received from the network.

A specific packet mentioned above is (1) a unicast packet addressed to the MFP 100, (2) a return packet requesting a return from the sleep mode, or (3) a broadcast packet/multicast packet of a specific protocol, for example. The return packet (2) is a magic packet including a specific pattern. The broadcast/multicast packet of a specific protocol (3) is a search packet in compliance with a protocol, which is designed for another node on the LAN 103 to search for an MFP on the network, for example.

In addition to the cases described above, in a case where the NIC's 101 connection to the network is detected again, the MFP 100 returns to the standby state. The MFP 100 returns to the standby state not only when the network cable is attached to the network I/F 204 of the NIC 101, but also when the NIC 101 is electrically connected to the hub 102. In other words, under the condition that the network cable is connected to the NIC 101, when power is supplied again to the hub 102, or when the hub itself is replaced with another one, the MFP 100 returns to the standby state.

When the result of a determination in step S701 is that the condition for the MFP 100 to return to the standby state is met, the process proceeds to step S702, where the CPU 221 cancels the sleep mode. More specifically, the CPU 221 cancels stoppage of power supply to the respective units, and resumes power supply to them. In addition, the communication mode setting unit 313, by using an "ioctl" command, notifies the NIC driver 312 that the MFP has shifted to the standby state. When receiving this notification, the NIC driver 312, in step S703, supplies the NIC 101 with a command to terminate the link to the network.

On the NIC 101 side, in step S704, upon receiving the command from the NIC driver 312, the CPU 201 terminates the link to the network.

Further, on the MFP 100 side, in step S705, the communication mode setting unit 313, by using an "ioctl" command, notifies the NIC driver 312 of the communication mode when the MFP 100 is in the standby state, and the NIC driver 312 causes the NIC 101 to set the communication mode therein. A communication mode when the MFP 100 is in the standby state notified at this time is a communication mode set via the setting screen illustrated in FIG. 4.

On the NIC 101 side, in step S706, the CPU 201 sets a communication mode notified from the MFP 100 as a communication mode to be used when the NIC 101 communicates with the hub 102, and establish a link to the hub 102. When a communication mode when the MFP 100 is in the standby state is autonegotiation, the NIC driver 312 executes an autonegotiation process to determine a communication mode to be set by the NIC 101 based on communication modes in which the hub 102 can operate.

The communication mode in the standby state can be stored in and managed by a register in the NIC 101 even while the MFP 100 is in the sleep mode. In this case, when the MFP 100 returns from the sleep mode to the standby state, if a message only to the effect that the MFP 100 shifts to the sleep mode is sent to the NIC 101, the communication mode up to that time is changed to a communication mode when the MFP 100 is in the standby state, which has been managed by a register in the NIC 101.

On the MFP 100 side, in step S707, the communication mode setting unit 313 makes inquiry to the NIC driver 312 about the communication capability of the hub 102 by using an "ioctl" command. In response to this inquiry, the NIC driver 312 requests the NIC 101 to send capability information indicating the communication capability of the hub 102. When receiving this request, NIC 101, in step S708, sends the capability information of the hub 102 to the MFP 100.

More specifically, at this time, the communication setting unit 313 refers via the NIC driver 312 to the content of the link-partner-ability register, and acquires the capability information of the hub 102.

For a time when establishing a link to the hub 102 in step S706, the capability information of the hub 102 can be acquired previously by having the NIC 101 communicate with the hub 102. This acquisition of the capability information is performed when the communication mode in the standby state is not autonegotiation (when a specific communication speed and a duplex mode are specified).

In step S709, the CPU 221 determines whether the capability information of the hub 102 has been acquired successfully. If it is determined that the capability information of the hub 102 has been acquired (YES in step S709), the process proceeds to step S710, where the CPU 221 determines whether the hub 102 supports a communication speed of 10 Mbps. If the determination result is that the hub 102 supports a communication speed of 10 Mbps (YES in step S710), the process proceeds to step S711.

In step S711, the communication mode setting unit 313 determines that a communication mode to be used when the NIC 101 communicates with the hub 102 under the condition that the MFP 100 has shifted to the sleep mode should be 10 Mbps. The communication mode setting unit 313 notifies information about the determined communication mode to the NIC driver 312.

If it is determined in step S709 that the capability information of the hub 102 has not been acquired, or if it is determined in step S710 that the hub 102 does not support a communication speed of 10 Mbps, the process proceeds to step S712.

In step S712, the communication mode setting unit 313 determines a communication mode to be used when the NIC 101 communicates with the hub 102 under the condition that the MFP 100 has shifted to the sleep mode as autonegotiation. The communication mode setting unit 313 notifies the information indicating the determined communication mode to the NIC driver 312.

As described above, the communication mode setting unit 313 acquires information about the capability information of the hub 102, and determines a communication mode in the sleep mode not only when the MFP 100 has started its operation, but also when the MFP 100 has returned to the standby state from the sleep mode. This is because the MFP's 100 return from the sleep mode to the standby state sometimes results from re-supply of power to the hub 102 or replacement of the hub 102 itself.

More specifically, when the hub 102 is replaced with another hub, the newly installed hub may not have the same communication capability as the previous hub. However, even when the hub 102 is changed, by checking the communication capability of the hub 102 again, it is possible to respond to the changing situation. This can be said of a case where even if the hub 102 is not changed, the communication settings of the hub 102 are changed and power is applied again to the hub 102.

Figure 8:
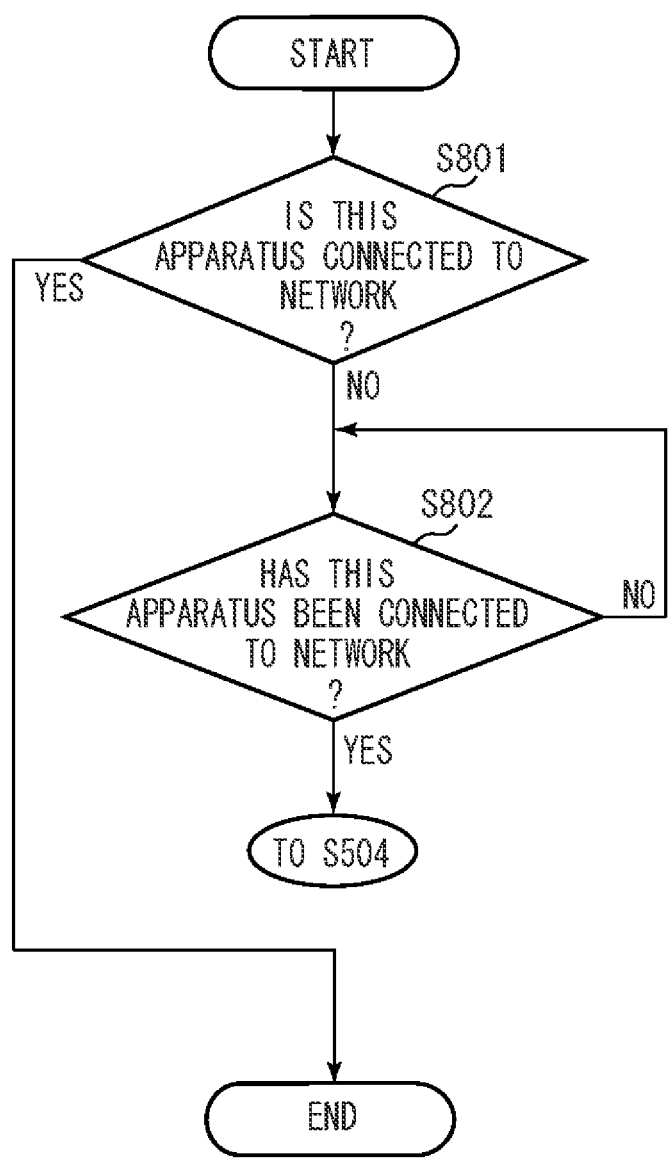
FIG. 8 is a flowchart illustrating the operation of the MFP and the NIC, which is performed when the MFP is in the standby state, according to the first exemplary embodiment of the present invention.

Next, the operation of the MFP 100 in the standby state will be described. FIG. 8 is a flowchart illustrating the operation of the MFP 100 and the NIC 101 when the MFP 100 is in the standby state.

In step S801, the MFP 100 in the standby state determines whether the NIC 101 is connected to a network. More specifically, not only is it determined whether the network cable is attached to the network I/F 204 of the NIC 101, but it is also determined whether the NIC 101 is electrically connected to the hub 102.

If the determination result in step S801 is that the NIC 101 is connected to the network (YES in step S801), the process is finished. If it is determined that the NIC 101 is not connected to the network (NO in step S801), the process proceeds to step S802.

In step S802, the MFP 100 determines whether the NIC 101 is connected to the network anew. Here again, not only is it determined whether the network cable is attached to the network I/F 204 of the NIC 101, but it is also determined whether the NIC 101 is electrically connected to the hub 102.

If the determination result in step S802 is that the NIC 101 has been connected to the network (YES in step S802), the process advances to step S504 in FIG. 5. In other words, when the MFP 100 is in the standby state and is connected anew to the network, the MFP 100, just as when the MFP 100 is started, causes the NIC 101 to establish a link to the network in the communication mode in the standby state, and also determines a communication mode in the sleep mode.

As described above, the communication mode setting unit 313 again acquires the capability information of the hub 102 and determines a communication mode in the sleep mode not only when the MFP 100 is started, but also when the MFP 100 is in the standby state and is connected anew to the network. This is because the communication capability of the newly connected hub 102 is sometimes different from that of the old hub.

In other words, when the hub 102 is replaced with another hub, because the newly installed hub 102 may not have the same communication capability as that of the old hub, if the communication capability of the hub 102 is checked again and the interface devices and settings are matched, it is possible to use the newly installed hub. This can be said of a case where the hub 102 has not been changed, but communication settings of the hub 102 are changed and power is again supplied to the hub 102.

A second exemplary embodiment of the present invention will next be described. The hardware configuration and the software configuration of the MFP 100 and the NIC 101 in the present exemplary embodiment are similar to those in the previous exemplary embodiment, and therefore, their descriptions are not repeated here. The configuration of the communication system is also similar to that of the previous exemplary embodiment.

In the present exemplary embodiment, when the MFP 100 returns from the sleep mode to the standby state, the CPU 221 determines the factor for return, and, according to whether the factor for return is a specific factor or not, again acquires capability information of the hub 102 and again determines a communication mode in the sleep mode.

Figure 9:
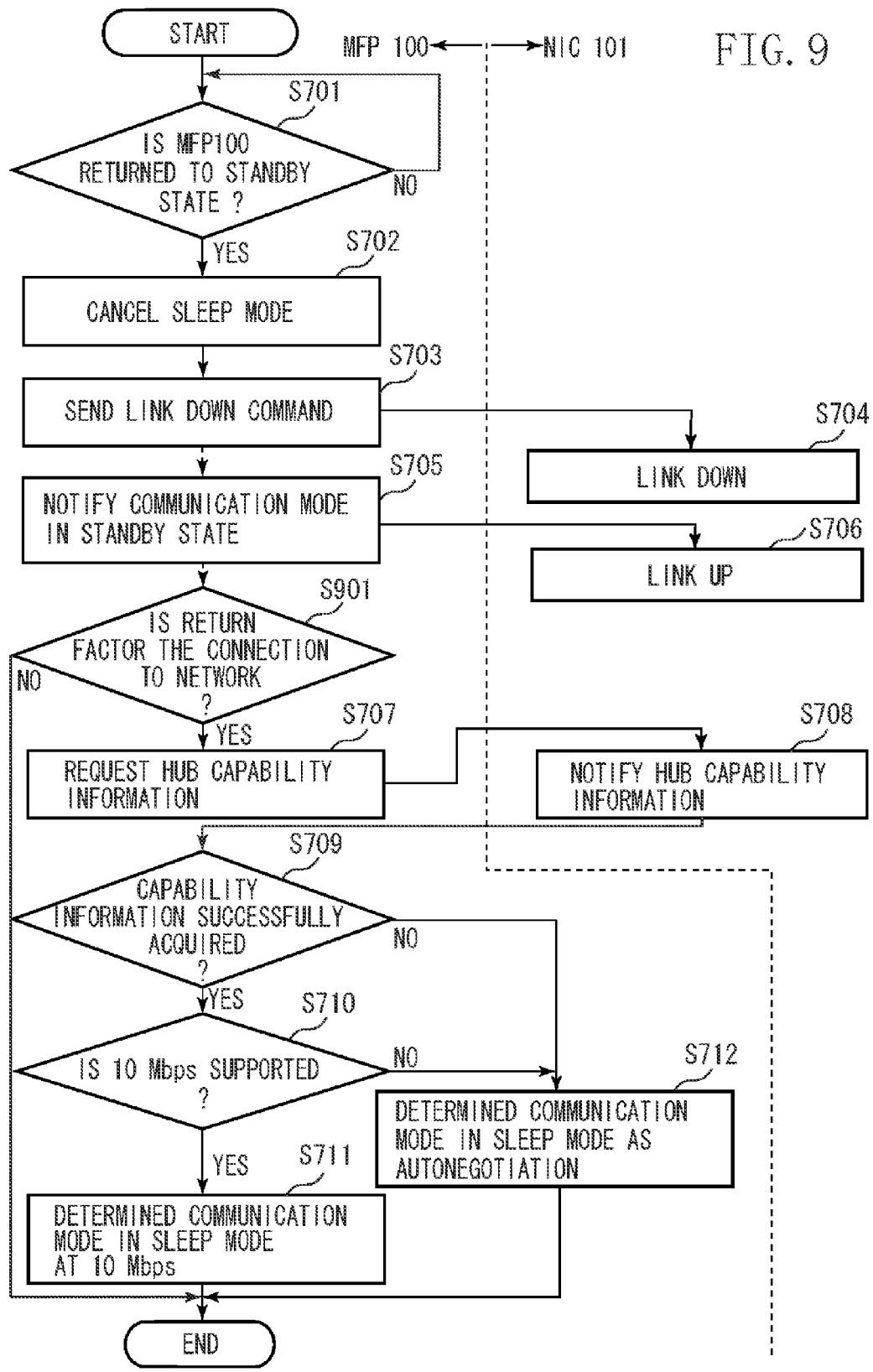
FIG. 9 is a flowchart illustrating the operation of the MFP and the NIC, which is performed when the MFP returns from the sleep mode to the standby state, according to a second exemplary embodiment of the present invention.

FIG. 9 is a flowchart illustrating the operation of the MFP 100 and the NIC 101 performed when the MFP 100 returns from the sleep mode to the standby state. The flowchart in FIG. 9 corresponds to the flowchart in FIG. 7, except step S901 added in FIG. 9. The operations from step S701 to step S712 are the same and, therefore, their descriptions are not repeated herein.

In step S705, the communication mode setting unit 313 notifies the NIC driver 312 of a communication mode in the standby state by using an "ioctl" command, and causes the NIC 101 to set the communication mode therein, and after this, the process advances to step S901.

In step S901, the CPU 221 determines whether the factor for the MFP 100 to return from the sleep mode to the standby state is a specific factor. The specific factor here denotes that the NIC 101 is connected to the network. In other words, in step S901, the CPU 221 determines whether the MFP 100 returns as a result of the NIC 101 being connected to the network. Also in this determination process, not only is it determined whether the network cable is attached to the network I/F 204 of the NIC 101, but it is also determined whether the NIC 101 is electrically connected to the hub 102.

If the determination result in step S901 is that the factor for return is the NIC 101 is connected to the network (YES in step S901), the process proceeds to step S707, where the CPU 221 acquires capability information of the hub 102, and determines a communication mode in the sleep state. If the determination result in step S901 is that the factor for return is not that the NIC 101 is connected to the network (NO in step S901), the process is terminated.

As described above, in the present exemplary embodiment, when the MFP 100 returns from the sleep mode to the standby state, it is not routine practice to acquire capability information of the hub 102 and determine a communication mode in the sleep mode, but whether to take these steps is determined according to the situation. If the factor for return is that the user operates the operation unit 230 or that a specific packet mentioned above is received from the network, the communication capability of the hub 102 is considered not changed. In other words, if it is apparent that the communication capability of the hub 102 has not changed, by omitting the acquisition of the hub 102 capability information or the determination of communication mode, the load on processing in the MFP 100 can be reduced.

The present invention can take various forms of exemplary embodiments, such as a system, apparatus, method, program and storage medium (recording medium), for example. More specifically, this invention can be applied to a system, which includes a number of devices, or applied to a device formed of a single unit.

According to the present invention, a software program that implements the functions of the exemplary embodiment described above (a program corresponding to the flowchart in the embodiment) is supplied directly or remotely from an external device to a system or apparatus. In some cases, the functions of the present invention can be implemented as the computer of the system or apparatus reads and executes the program code supplied.

Therefore, since the functions of an exemplary embodiment of the present invention are implemented by a computer, the program code itself, installed in the computer, also implements the present invention. In other words, the present invention covers a computer program itself, configured to implement the functions of the embodiment of the present invention.

In this case, so long as the functions of the program are included, the software program can be in any form, such as object code, a program executable by the interpreter, or script data supplied to the OS.

Recording media that can be used to supply the program include, for example, a floppy disk, hard disk, optical disk, magneto-optic disk, MO, CD-ROM, CD-R, CD-RW, magnetic tape, nonvolatile memory card, ROM, and DVD (DVD-ROM, DVD-R).

As for a program supply method, the program of the present invention can be supplied by downloading the program into a recording medium, such as a hard disk, from a web site on the Internet by using a browser of a client computer. In other words, a computer program of each exemplary embodiment of the present invention can be obtained from the web site of a download source site by connecting to the site, or by downloading a compressed file, which includes an automatic installation function. The program of an exemplary embodiment of the present invention can be supplied by dividing the program code constituting the program into plurality of files and downloading the files from different websites. In other words, a World Wide Web (WWW) server that supplies a plurality of users with the program files that implement the functions of an exemplary embodiment of the present invention by the computer is also covered by the present invention.

The program of an exemplary embodiment of the present invention can be supplied to users by encrypting and storing the program on a computer-readable recording medium, such as a CD-ROM. The users who meet certain requirements are permitted to download decryption key information from a website on the Internet. Then, the users can decrypt the encrypted program by using the key information, and execute the program on the computer.

Thus, the above-mentioned functions of the exemplary embodiments are implemented by executing the program on the computer. Furthermore, according to commands of the program, the OS running on the computer performs all or part of the processes, thus implementing the functions of the embodiments.

Moreover, after the program read from the recording medium is written to a function expansion board inserted into the computer or to a memory provided in a function expansion unit connected to the computer, the above-mentioned functions of the embodiments are further implemented. In other words, in response to commands from the program, the CPU or the like mounted on the function expansion board or the function expansion unit carries out all or part of the processes to execute the functions of the embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A communication apparatus comprising:
   a communication unit configured to perform a communication;
   a acquiring unit configured to acquire capability information indicating a communication capability of an external apparatus; and
   a first determining unit configured to, based on the capability information acquired by the acquiring unit, determine a communication mode for performing the communication by the communication unit when the communication apparatus operates in a second power mode lower in power consumption than in a first power mode,
   wherein the first power mode is a power mode for supplying power to at least the first determining unit, and the second power mode is a power mode for not supplying power to at least the first determining unit,
   wherein the first determining unit is configured to determine the communication mode based on the capability information acquired by the acquiring unit, before the communication apparatus shifts to the second power mode, and
   wherein the communication unit is configured to perform the communication by using the communication mode determined by the first determining unit, in a case where the communication apparatus operates in the second power mode.

2. The communication apparatus according to claim 1, further comprising:
   a setting unit configured to set the communication mode determined by the first determining unit, in the communication unit,
   wherein the communication unit is configured to perform the communication by using the communication mode set by the setting unit, in a case where the communication apparatus operates in the second power mode.

3. The communication apparatus according to claim 2, wherein the setting unit is configured to set, in the communication unit, the communication mode determined by the first determining unit, in a case where the communication apparatus shifts from the first power mode to the second power mode.

4. The communication apparatus according to claim 1, further comprising:
   a storing unit configured to store setting information indicating a communication mode set by a user,
   wherein the communication unit is configured to perform the communication by using the communication mode specified by the setting information, in a case where the communication apparatus operates in the first power mode, and
   wherein the communication unit is configured to perform the communication by using the communication mode determined by the first determining unit, in a case where the communication apparatus operates in the second power mode.

5. The communication apparatus according to claim 1, further comprising:
   a second determining unit configured to determine whether the external apparatus supports a specific communication speed, based on the capability information acquired by the acquiring unit,
   wherein, in a case where the second determining unit determines that the external apparatus supports the specific communication speed, the first determining unit determines that the communication mode, which is for performing the communication by the communication unit when the communication apparatus operates in the second power mode, is the specific communication speed.

6. The communication apparatus according to claim 5, wherein the specific communication speed is 10 Mbps.

7. The communication apparatus according to claim 5, wherein, in a case where the second determining unit determines that the external apparatus does not support the specific communication speed, the first determining unit determines that the communication mode, which is for performing the communication by the communication unit when the communication apparatus operates in the second power mode, is AutoNegotiation.

8. The communication apparatus according to claim 1, wherein the acquiring unit is configured to acquire the capability information when the communication apparatus is started.

9. The communication apparatus according to claim 1, wherein, in a case where the capability information is not acquired by the acquiring unit, the first determining unit determines that the communication mode, which is for performing the communication by the communication unit when the communication apparatus operates in the second power mode, is AutoNegotiation.

10. The communication apparatus according to claim 1, wherein the communication unit is NIC.

11. The communication apparatus according to claim 1, wherein the external apparatus is HUB.

12. The communication apparatus according to claim 1, further comprising:
    a printing unit configured to perform printing processing,
    wherein the first power mode is a power mode for supplying power to at least the first determining unit and the printing unit, and the second poser mode is a power mode for not supplying power to at least the first determining unit and the printing unit.

13. A communication method including a communication apparatus, the communication method comprising:
    performing a communication with a communication unit;
    acquiring capability information indicating a communication capability of an external apparatus; and
    determining, based on the capability information acquired, a communication mode for performing the communication by the communication unit when the communication apparatus operates in a second power mode lower in power consumption than in a first power mode,
    wherein the first power mode is a power mode for supplying power to determine the communication mode, and the second power mode is a power mode for not supplying power to determine the communication mode,
    wherein the communication mode is determined based on the capability information acquired, before the communication apparatus shifts to the second power mode, and
    wherein the communication unit is configured to perform the communication by using the communication mode determined, in a case where the communication apparatus operates in the second power mode.

14. A non-transitory computer-readable storage medium storing instructions of a computer program for implementing a method, according to claim 13.

* * * * *